US012322230B2

United States Patent
Xu et al.

(10) Patent No.: US 12,322,230 B2
(45) Date of Patent: Jun. 3, 2025

(54) DYNAMIC RESERVATION OF A CHARGING STATION SLOT FOR A VEHICLE

(71) Applicant: GM GLOBAL TECHNOLOGY OPERATIONS LLC, Detroit, MI (US)

(72) Inventors: An Xu, Shanghai (CN); Huan Lu, Shanghai (CN); Feiyu Cong, Shanghai (CN); Jieping Wang, Shanghai (CN); Lingjin Zhuang, Shanghai (CN); Xuekai Zhuang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 128 days.

(21) Appl. No.: 18/480,701

(22) Filed: Oct. 4, 2023

(65) Prior Publication Data

US 2025/0046136 A1    Feb. 6, 2025

(30) Foreign Application Priority Data

Jul. 31, 2023   (CN) .......................... 202310952321.0

(51) Int. Cl.
  *G07C 9/00*  (2020.01)
  *G01C 21/36*  (2006.01)
  *G06Q 10/02*  (2012.01)

(52) U.S. Cl.
  CPC ..... *G07C 9/00896* (2013.01); *G01C 21/3679* (2013.01); *G06Q 10/02* (2013.01);
  (Continued)

(58) Field of Classification Search
  CPC ............ G07C 9/00896; G07C 9/00309; G07C 2209/08; G01C 21/3679; G06Q 10/02; B60L 53/68; G08G 1/149
  See application file for complete search history.

(56) References Cited

U.S. PATENT DOCUMENTS

| 2012/0179323 A1 | 7/2012 | Profitt-Brown et al. |
| 2012/0233077 A1* | 9/2012 | Tate, Jr. ................. G06Q 10/20 705/65 |

(Continued)

FOREIGN PATENT DOCUMENTS

| DE | 19502223 A1 | 8/1996 |
| DE | 102015204368 A1 | 9/2016 |

(Continued)

OTHER PUBLICATIONS

Foreign Office Action dated Mar. 25, 2024.

*Primary Examiner* — Vernal U Brown
(74) *Attorney, Agent, or Firm* — Quinn IP Law

(57) ABSTRACT

A method of controlling a reservation at a charging station for a vehicle includes a controller in communication with a remote advisory unit. The method includes positioning a ground lock at the charging slot, the ground lock being controllable through a station command unit. The method includes generating an identification number through the remote advisory unit and transmitting the identification number to the controller and the station command unit. The identification number is randomly generated. The ground lock is moved to a blocking position when an estimated time of arrival of the vehicle is less than a first threshold. The method includes broadcasting a message to the station command unit with the identification number, via the controller, when the estimated time of arrival is less than a second threshold. The ground lock is moved to a non-blocking position when an authentication process is completed.

20 Claims, 3 Drawing Sheets

(52) U.S. Cl.
CPC ..... *G07C 9/00309* (2013.01); *G07C 9/00944* (2013.01); *G07C 2009/00793* (2013.01); *G07C 2209/08* (2013.01)

(56) References Cited

U.S. PATENT DOCUMENTS

| | | | |
|---|---|---|---|
| 2024/0221103 A1* | 7/2024 | Ward | G06Q 50/40 |
| 2024/0270113 A1* | 8/2024 | Anand | B60L 53/665 |

FOREIGN PATENT DOCUMENTS

| | | |
|---|---|---|
| DE | 102016110031 A1 | 12/2016 |
| DE | 102017216417 A1 | 3/2019 |
| DE | 102019217936 A1 | 5/2021 |
| DE | 102019133276 A1 | 6/2021 |

\* cited by examiner

DYNAMIC RESERVATION OF A CHARGING STATION SLOT FOR A VEHICLE

CROSS-REFERENCE TO RELATED APPLICATIONS

This application claims priority to and the benefit of Chinese Patent Application No. CN202310952321.0, which was filed on Jul. 31, 2023, and which is hereby incorporated by reference in its entirety.

INTRODUCTION

The present disclosure relates generally to controlling a reservation of a charging slot at a charging station for a vehicle. The use of purely and partially electric vehicles, such as battery electric vehicles, range-extended electric vehicles, hybrid electric vehicles, and fuel cell hybrid electric vehicles, has increased greatly over the last few years. Electric vehicles include a rechargeable energy storage unit, such as a high voltage battery having a number of battery cells, which requires periodic recharging. The charging may be done at a public or private charging station. Public charging stations are typically found street-side or at retail shopping centers, public facilities, and other parking areas. Charging stations may have limited capacity for charging slots and may be spread throughout a region.

SUMMARY

Disclosed herein is a method of controlling a reservation at a charging station for a vehicle with a controller having a processor and tangible, non-transitory memory on which instructions are recorded. The controller is in communication with a remote advisory unit. The method includes positioning a ground lock at the charging slot, the ground lock being controllable through a station command unit. The method includes generating an identification number through the remote advisory unit and transmitting the identification number to the controller and the station command unit, the identification number being randomly generated. An estimated time of arrival of the vehicle at the charging station is monitored through the remote advisory unit.

The ground lock is moved to a blocking position such that entry to the charging slot is blocked when the estimated time of arrival is less than a first threshold, via the station command unit. The method includes broadcasting a message to the station command unit with the identification number, via the controller, when the estimated time of arrival is less than a second threshold. The ground lock is moved to a non-blocking position through the station command unit such that entry to the charging slot is permitted when an authentication process is completed.

The authentication process may be completed when the identification number broadcasted by the controller matches with the identification sent to the station command unit by the remote advisory unit. The method may include adapting the vehicle and the station command unit to delete the identification number after the vehicle has entered the charging slot. In some embodiments, the first threshold is set to be about 30 minutes. The second threshold may be set to be at or below 5 minutes.

The method may include adapting the controller to broadcast the message to the station command unit through a short-band network. The method may include adapting the remote advisory unit to communicate with the controller through a cellular connection. The remote advisory unit may be adapted to communicate with the station command unit through an internet connection. The method may include incorporating a base portion and a barrier portion in the ground lock positioned at the charging slot. The barrier portion is operatively connected to the base portion and is movable between the blocking position and the non-blocking position.

Prior to generating the identification number through the remote advisory unit, the method may include requesting charging station data for an area in proximity to a predefined route, as well as retrieving and transmitting an updated version of the charging station data to the controller, via the remote advisory unit. The method may include selecting the charging station based in part on the updated version of the charging station data, via the controller, and setting the charging station as a navigation destination for the vehicle.

In some embodiments, the method includes determining whether an elapsed time is greater than a cancellation grace period when the navigation setting is canceled after the ground lock is in the blocking position, via the controller. The method may include transmitting a request to the remote advisory unit to cancel the reservation of the charging slot when the elapsed time is greater than the cancellation grace period, via the controller, the station command unit being adapted to move the ground lock to the non-blocking position. The method may include adapting the vehicle and the station command unit to delete the identification number when the elapsed time is greater than the cancellation grace period. In some embodiments, the cancellation grace period is set to be between about 5 and 10 minutes.

Disclosed herein is a system for controlling a reservation at a charging station for a vehicle. The system includes a controller having a processor and tangible, non-transitory memory on which instructions are recorded, the controller being with a remote advisory unit. A ground lock is positioned at a charging slot in the charging station, the ground lock being movable between a blocking position for blocking entry to the charging slot and a non-blocking position permitting entry to the charging slot. A station command unit in communication with the controller, the ground lock being controllable by the station command unit. A remote advisory unit adapted to generate an identification number and transmitting the identification number to the controller and the station command unit, the identification number being randomly generated.

The remote advisory unit is adapted to monitor an estimated time of arrival of the vehicle at the charging station. The station command unit is adapted to move the ground lock to a blocking position such that entry to the charging slot is blocked when the estimated time of arrival is less than a first threshold. The controller is adapted to broadcast a message to the station command unit with the identification number, when the estimated time of arrival is less than a second threshold. The station command unit is adapted to move the ground lock to a non-blocking position through such that entry to the charging slot is permitted when an authentication process is completed.

The above features and advantages and other features and advantages of the present disclosure are readily apparent from the following detailed description of the best modes for carrying out the disclosure when taken in connection with the accompanying drawings.

Figure 1:
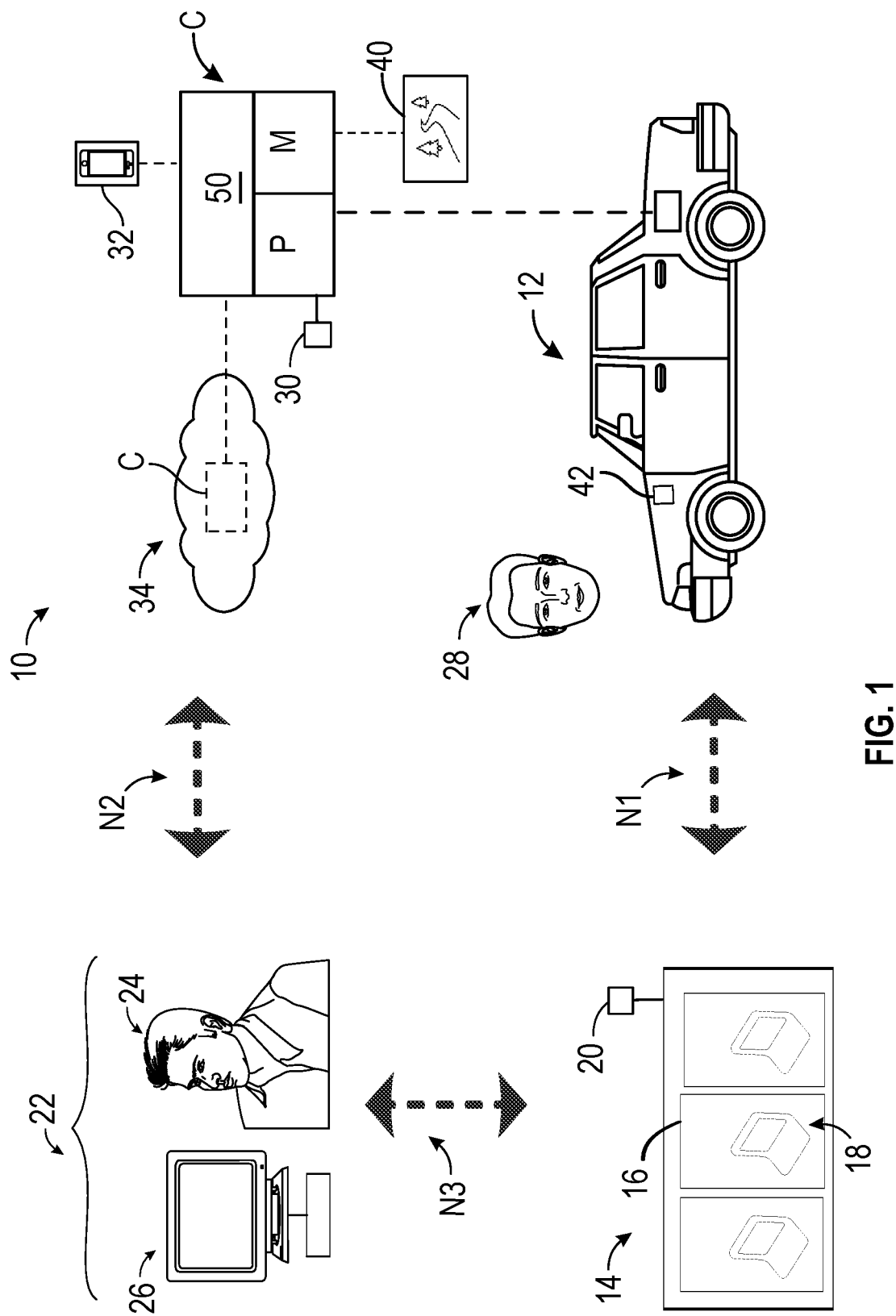
FIG. 1 is a schematic fragmentary diagram of a system for controlling slot reservation at a charging station for a vehicle.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for controlling operation of a vehicle 12 that may be purely or partially electric. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train, or another moving platform. It is to be understood that the vehicle 12 may take many different forms and have additional components.

The vehicle 12 includes a rechargeable energy storage unit, such as a high voltage battery with battery cells, that is capable of utilizing an external source of power at a charging station 14. Referring to FIG. 1, the controller C has at least one processor P and at least one memory M (or non-transitory, tangible computer readable storage medium) on which instructions are recorded for a method 100 for controlling a reservation at the charging station 14 for the vehicle 12. Method 100 is described below with respect to FIGS. 2-3. The memory M can store command unit-executable instruction sets, and the processor P can execute the command unit-executable instruction sets stored in the memory M.

Figure 4:
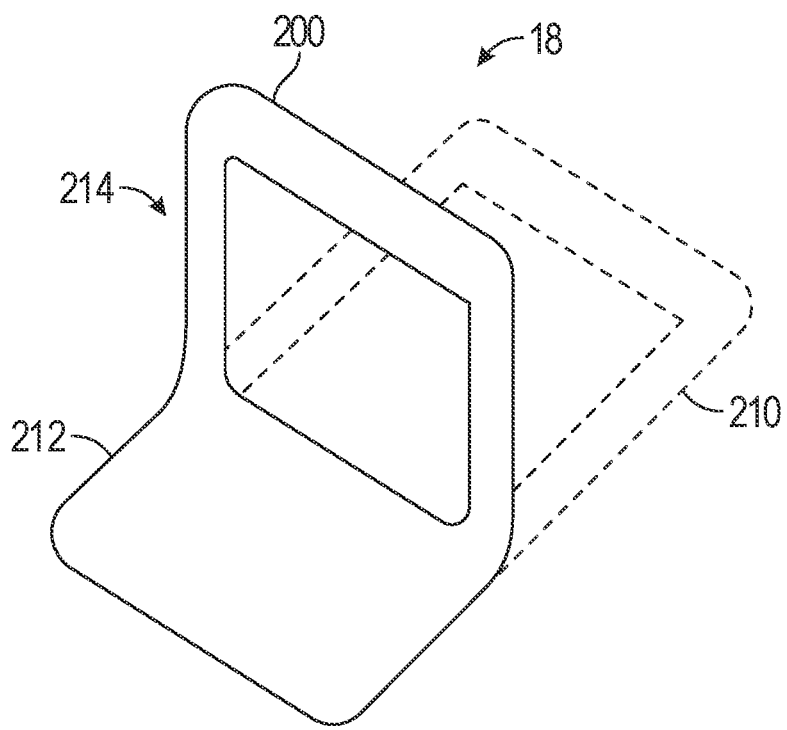
FIG. 4 is a schematic diagram of an example ground lock employable in the system of FIG. 1.

The charging station 14 may include one or more slots connected to a power source or power grid with stored electrical energy, each slot having a respective ground lock. For example, referring to FIG. 1, a ground lock 18 is positioned at the charging slot 16. The ground lock 18 is controllable through a station command unit 20. A schematic diagram of an example ground lock 18 is shown in FIG. 4.

As described below, the system 10 (via execution of method 100) enables dynamic control and reservation of the charging slot 16 at the charging station 14. The system 10 relies on the interaction of the controller C with a remote advisory unit 22, and the station command unit 20 at the charging station 14. The remote advisory unit 22 ("back office") may be manned electronically and/or by a remote advisor 24 having access to an electronic device 26 such as a desktop computer, laptop, tablet, cell phone or wearable device. The remote advisory unit 22 may include one or more servers that each include a processing device and a memory device. In one embodiment, the remote advisory unit 22 is OnStar™.

The system 10 enables a user 28 of the vehicle 12 to have a more efficient charging experience. It relies on the remote advisory unit 22 to generate a temporary randomly generated identification number to complete an authentication process that avoids leakage of private information. While the vehicle 12 is on route to the charging station 14, the controller C continues to calculate the estimated time of arrival and updates the remote advisory unit 22. When vehicle 12 is sufficiently close to the charging station 14, the controller C is adapted to initiate communication with the station command unit 20. As described below, the station command unit 20 at the charging station 14 automatically controls the respective position of the ground lock 18 based on the estimated time of arrival of the vehicle 12 at the charging station 14.

Referring to FIG. 1, the vehicle 12 includes a telematics module 30 for establishing two-way communications. The telematics module 30 may collect telemetry data, such as location, speed, powertrain data, maintenance requirements and servicing, by interfacing with various internal subsystems of the vehicle 12. The telematics module 30 may enable vehicle-to-vehicle communication (V2V) and/or a vehicle-to-everything communication (V2X).

Referring to FIG. 1, the vehicle 12 may include a mobile application 32 embedded in a smart device (e.g., smart phone) belonging to the user 28 of the vehicle 12. The mobile application 32 may be plugged in or otherwise linked to the vehicle 12. The circuitry and components of a mobile application ("apps") available to those skilled in the art may be employed.

If the vehicle 12 is part of a fleet, the controller C may be embedded in a master or leader vehicle. In another embodiment, the controller C may be hosted or based out of a remotely located cloud computing service 34, shown in FIG. 1. The cloud computing service 34 may include one or more remote servers hosted on the Internet to store, manage, and process data. The cloud computing service 34 may be at least partially managed by personnel at various locations.

Figure 2:
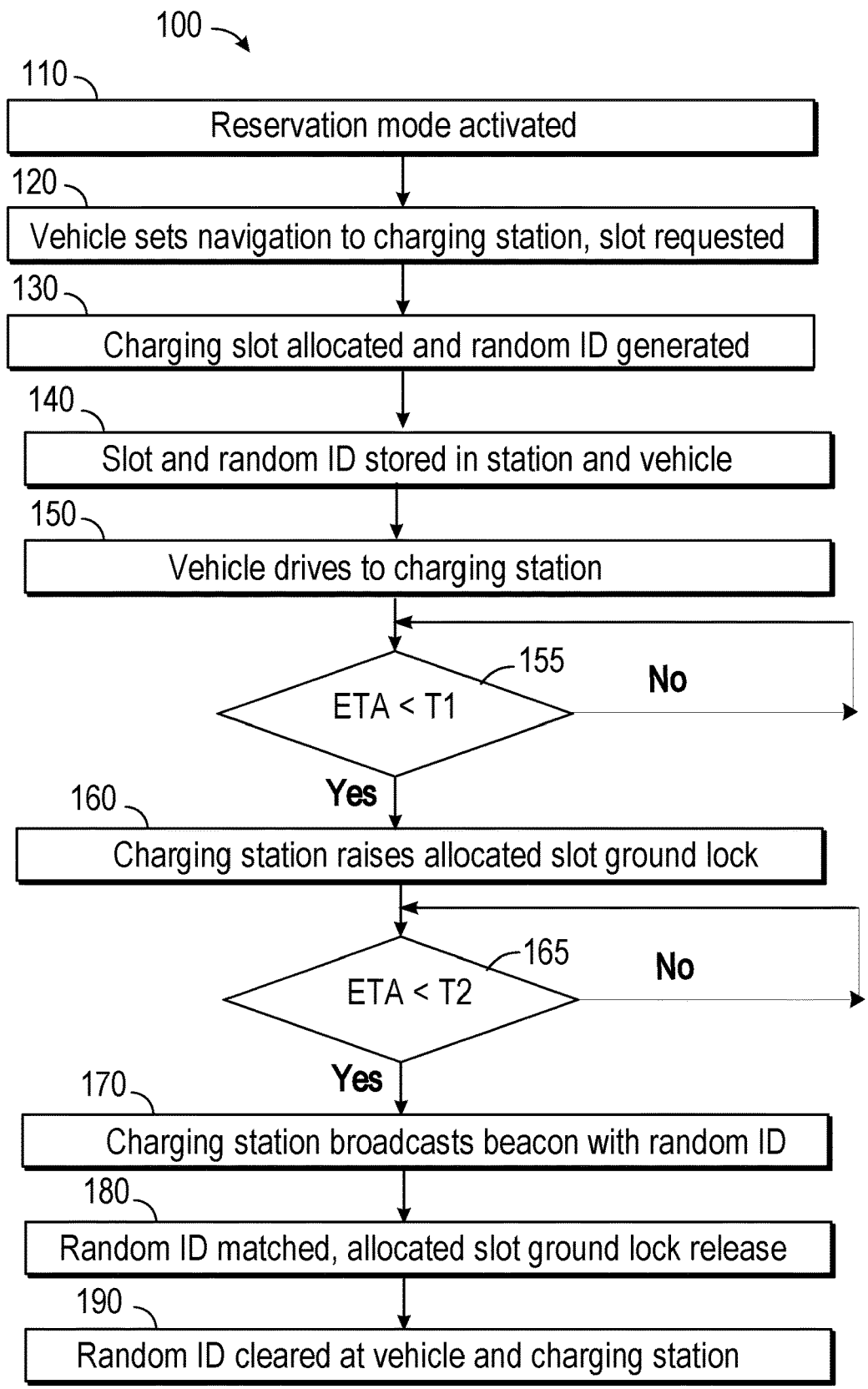
FIG. 2 is a flowchart for a method of operating the system of FIG. 1.

Referring now to FIG. 2, a flowchart of an example method 100 of operating the system 10 is shown. Method 100 may be embodied as computer-readable code or instructions stored on and at least partially executable by the controller C. Method 100 need not be applied in the specific order recited herein. Furthermore, it is to be understood that some blocks or steps may be eliminated. Method 100 may be executed in real-time, continuously, systematically, sporadically and/or at regular intervals, for example, each 10 milliseconds during normal and ongoing operation of the vehicle 12.

The method 100 of FIG. 2 begins at block 110 when a reservation mode 50 (see FIG. 1) is activated in the vehicle 12. The reservation mode 50 may be activated by the user 28 through a vehicle infotainment unit and/or the mobile application 32. Block 110 includes sub-blocks 112, 114, 116 and 118, shown in FIG. 3.

Figure 3:
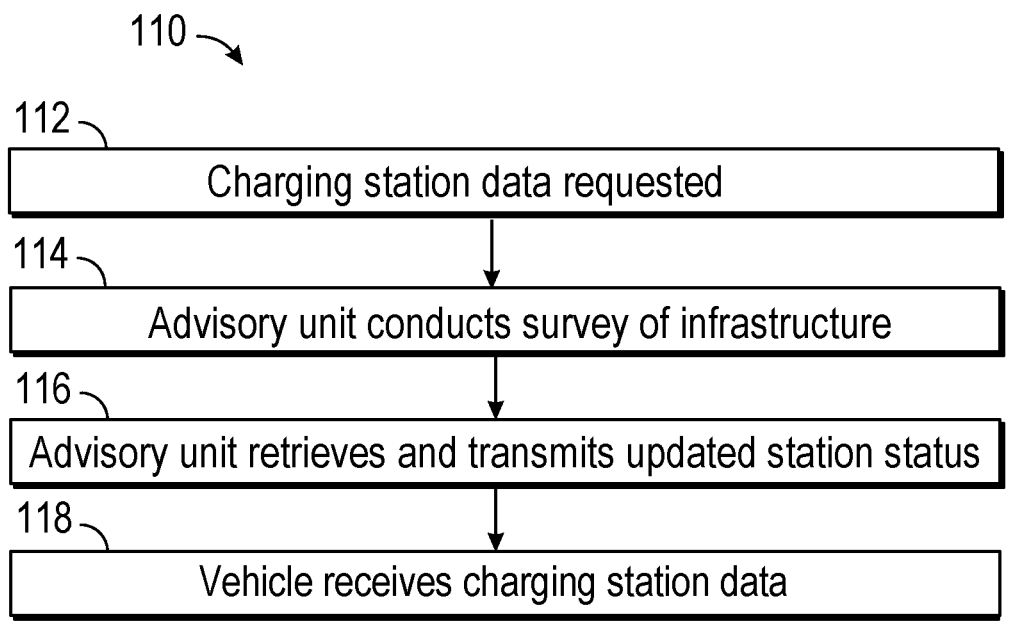
FIG. 3 is a flowchart of a portion of the method of FIG. 2.

Per sub-block 112 of FIG. 3, the controller C is adapted to request charging station data for an area in proximity to a predefined route 40 of the vehicle 12. The route 40 may be obtained with a trajectory planner and the use of data from sensors 42 onboard the vehicle 12, such as a navigation sensor (e.g., GPS), radar, camera and other types of technologies available to those skilled in the art. In some embodiments, an automated driving operation for the vehicle 12 may be implemented based on the route 40.

Per sub-block 114 of FIG. 3, the remote advisory unit 22 is adapted to conduct a survey of local charging infrastructure and retrieve an updated version of charging station data. In some embodiments, the controller C may request charging station data within a certain straight-line distance of the real-time GPS position of the vehicle 12. In other embodiments, the controller C may request charging station data in proximity to the route 40. Per sub-block 116, the remote advisory unit 22 is adapted to retrieve an updated charging station status and filter the surrounding charging station data for a best match. Per sub-block 118, the charging station data is transmitted to the vehicle 12, which may display the data in an app.

The method 100 advances from block 110 to block 120, where the controller C sets navigation to the selected charging station 14 and requests a charging slot 16. Advancing to block 130 of FIG. 2, the charging slot 16 is allocated, and an identification number is generated by the remote advisory unit 22. Because the identification number is randomly generated and deleted at the end of the method 100, tracking of the vehicle 12 is prevented.

Proceeding to block 140, the identification number is sent together with a reserved slot identification number to the vehicle 12 and the station command unit 20 at the charging station 14. The identification number (identifying the transaction) and the reserved slot identification number (identifying the charging slot 16) is stored in the station command unit 20 and the controller C.

Advancing to block 150 of FIG. 2, the vehicle 12 drives to the charging station 14. Proceeding to block 155, the controller C is adapted to determine if the estimated time of arrival is less than a first threshold. In one example, the first threshold (T1) is about 30 minutes. If the estimated time of arrival is less than the first threshold (block 155=YES), the method 100 proceeds to block 160 where the station command unit 20 moves the ground lock 18 to a blocking position 200, shown in FIG. 4. If not, the method 100 loops back to block 150.

Referring now to FIG. 4, the example ground lock 18 is movable between a blocking position 200 physically blocking access to the charging slot 16 and a non-blocking position 210 permitting access to the charging slot 16. In this embodiment, the ground lock 18 has a base portion 212 that is fixed and operatively connected to a barrier portion 214 that is movable. In the embodiment shown in FIG. 4, the barrier portion 214 is upright and at about a 90° angle from the base portion 212 in the blocking position 200. The barrier portion 214 is relatively flat and at about a 180° angle from the base portion 212 in the non-blocking position 210. It is understood that other structural configurations for the ground lock 18 may be employed.

The method 100 proceeds to block 165 where the controller C is adapted to determine if the estimated time of arrival is less than a second threshold. In one example, the second threshold (T2) is at or below 5 minutes. The second threshold (T2) may be 2 minutes in one embodiment. If not (block 165=NO), the method 100 loops back to block 160. If so (block 165=YES), the method 100 proceeds to block 170 where the controller C is adapted to initiate communication with the station command unit 20 by broadcasting a message with the identification number. In some embodiments, the controller C is adapted to broadcast the message to the station command unit 20 through a short-band network N1, such that the ground lock is released when the vehicle 12 is at a relatively short distance from the charging station 14. The short-band network N1 may include short distance communication technology such as, but not limited to, Bluetooth™, ultra-wide band (UWB), Wi-Fi, and vehicle-to-everything (V2X).

Advancing to block 180, when the station command unit 20 receives the message and the identification number matches its record, it releases the ground lock 18 to the non-blocking position 210, which allows access to the vehicle 12 for charging at the charging slot 16. Per block 190, the station command unit 20 is adapted to clear the identification number from its memory and send a message to the vehicle 12 to let it clear the identification number from its memory as well.

Referring to FIG. 1, the remote advisory unit 22 may be adapted to communicate with the controller C through a cellular connection N2. The remote advisory unit 22 may be adapted to communicate with the station command unit 20 through an internet connection N3, such as an Ethernet connection. The cellular connection N2 may be a mobile connection, including but not limited to 3G, 4G, and 5G networks. It is understood that other types of network technologies or communication protocols available to those skilled in the art may be employed.

Referring to FIG. 1, if the user 28 cancels the navigation setting after the ground lock 18 is in the blocking position 200, the controller C will wait for a cancellation grace period, i.e., determine whether an elapsed time is greater than the cancellation grace period. During this time, if the user 28 resumes the navigation to the charging station 14, the ground lock status will remain unchanged. When the elapsed time is greater than the cancellation grace period, the controller C is adapted to transmit a request to the remote advisory unit 22 to cancel the reservation of the charging slot 16. With the cancellation of the charging slot 16, the station command unit 20 is adapted to move the ground lock 18 to the non-blocking position 210. The controller C and the station command unit 20 are adapted to delete the stored identification number when the elapsed time has exceeded the cancellation grace period.

In summary, a system 10 enables dynamic locking/unlocking of a charging slot 16 based on an authenticated process. The system 10 aligns spot availability to the arrival time of the vehicle 12. The user 28 sets the charging station 14 as the navigation destination and the controller C sends a request to remote advisory unit 22. The remote advisory unit 22 may reserve or allocate charging slots based on status reporting from the charging station 14. The remote advisory unit 22 is adapted to monitor the estimated time of arrival of the vehicle 12 at the charging station 14 and command the charging station 14 to move the ground lock 18 to a blocking position 200 when the estimated time of arrival is less than a first threshold, thereby reserving the charging slot 16 for the vehicle 12. The ground lock 18 is moved to a non-blocking position 210 when the estimated time of arrival is less than a second threshold or the vehicle 12 has arrived at the charging station 14. The system 10 improves the transfer efficiency of charging stations and minimizes the risk of private information from being leaked to third-party charging stations.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of controlling a reservation at a charging station for a vehicle with a controller having a processor and tangible, non-transitory memory on which instructions are recorded, the controller being in communication with a remote advisory unit, the method comprising:
positioning a ground lock at a charging slot in the charging station, the ground lock being controllable through a station command unit;
generating an identification number through the remote advisory unit, and transmitting the identification number to the controller and the station command unit, the identification number being randomly generated;
monitoring an estimated time of arrival of the vehicle at the charging station through the remote advisory unit;
moving the ground lock to a blocking position such that entry to the charging slot is blocked when the estimated time of arrival is less than a first threshold, via the station command unit;
broadcasting a message to the station command unit with the identification number, via the controller, when the estimated time of arrival is less than a second threshold; and
moving the ground lock to a non-blocking position through the station command unit such that entry to the charging slot is permitted when an authentication process is completed.

2. The method of claim 1, further comprising:
completing the authentication process when the identification number broadcasted by the controller matches with the identification sent to the station command unit by the remote advisory unit; and
adapting the vehicle and the station command unit to delete the identification number after the vehicle has entered the charging slot.

3. The method of claim 1, further comprising:
setting the first threshold to be about 30 minutes; and
setting the second threshold is at or below 5 minutes.

4. The method of claim 1, further comprising:
adapting the controller to broadcast the message to the station command unit through a short-band network.

5. The method of claim 4, further comprising:
adapting the remote advisory unit to communicate with the controller through a cellular connection; and
adapting the remote advisory unit to communicate with the station command unit through an internet connection.

6. The method of claim 1, further comprising:
incorporating a base portion and a barrier portion in the ground lock positioned at the charging slot, the barrier portion being operatively connected to the base portion; the barrier portion being movable between the blocking position and the non-blocking position.

7. The method of claim 1, further comprising, prior to generating the identification number through the remote advisory unit:
requesting charging station data for an area in proximity to a predefined route; and retrieving and transmitting an updated version of the charging station data to the controller, via the remote advisory unit; and selecting the charging station based in part on the updated version of the charging station data, via the controller, and setting the charging station as a navigation destination for the vehicle.

8. The method of claim 7, further comprising:

determining whether an elapsed time is greater than a cancellation grace period when the navigation setting is canceled after the ground lock is in the blocking position, via the controller; and transmitting a request to the remote advisory unit to cancel the reservation of the charging slot when the elapsed time is greater than the cancellation grace period, via the controller, the station command unit being adapted to move the ground lock to the non-blocking position.

9. The method of claim 8, further comprising:

adapting the vehicle and the station command unit to delete the identification number when the elapsed time is greater than the cancellation grace period.

10. The method of claim 9, further comprising:

setting the cancellation grace period to be between about 5 and 10 minutes.

11. A system for controlling a reservation at a charging station for a vehicle, the system comprising:

a controller having a processor and tangible, non-transitory memory on which instructions are recorded, the controller being with a remote advisory unit;

a ground lock positioned at a charging slot in the charging station, the ground lock being movable between a blocking position for blocking entry to the charging slot and a non-blocking position permitting entry to the charging slot;

a station command unit in communication with the controller, the ground lock being controllable by the station command unit;

a remote advisory unit adapted to generate an identification number and transmitting the identification number to the controller and the station command unit, the identification number being randomly generated;

wherein the remote advisory unit is adapted to monitor an estimated time of arrival of the vehicle at the charging station;

wherein the station command unit is adapted to move the ground lock to a blocking position such that entry to the charging slot is blocked when the estimated time of arrival is less than a first threshold;

wherein the controller is adapted to broadcast a message to the station command unit with the identification number, when the estimated time of arrival is less than a second threshold; and wherein the station command unit is adapted to move the ground lock to a non-blocking position through such that entry to the charging slot is permitted when an authentication process is completed.

12. The system of claim 11, wherein:

the authentication process is completed when the identification number broadcasted by the controller matches with the identification sent to the station command unit by the remote advisory unit; and the vehicle and the station command unit are adapted to delete the identification number after the vehicle has entered the charging slot.

13. The system of claim 11, wherein the first threshold is about 30 minutes, and the second threshold is about 5 minutes.

14. The system of claim 11, wherein:

the controller is adapted to broadcast the message to the station command unit through a short-band network;

the remote advisory unit is adapted to communicate with the vehicle through a cellular connection; and the remote advisory unit is adapted to communicate with the station command unit through an internet connection.

15. The system of claim 11, prior to generation of the identification number through the remote advisory unit, wherein the controller is adapted to:

request charging station data for an area in proximity to a predefined route of the vehicle, the remote advisory unit being adapted to retrieve and transmit an updated version of the charging station data to the controller; and select the charging station based in part on the updated version of the charging station data and set the charging station as a navigation destination for the vehicle.

16. The system of claim 15, wherein the controller is adapted to:

determine whether an elapsed time is greater than a cancellation grace period when the navigation setting is canceled after the ground lock is in the blocking position; and transmit a request to the remote advisory unit to cancel reservation of the charging slot when the elapsed time is greater than the cancellation grace period, via the controller, the station command unit being adapted to move the ground lock to the non-blocking position.

17. The system of claim 16, wherein the vehicle and the station command unit are adapted to delete the identification number when the elapsed time is greater than the cancellation grace period.

18. The system of claim 17, wherein the cancellation grace period is between about 5 and 10 minutes.

19. A system for controlling a reservation at a charging station for a vehicle, the system comprising:

a controller having a processor and tangible, non-transitory memory on which instructions are recorded, the controller being with a remote advisory unit;

a ground lock positioned at a charging slot in the charging station, the ground lock being movable between a blocking position for blocking entry to the charging slot and a non-blocking position permitting entry to the charging slot;

a station command unit in communication with the controller, the ground lock being controllable by the station command unit;

a remote advisory unit adapted to generate an identification number and transmitting the identification number to the controller and the station command unit, the identification number being randomly generated;

wherein the remote advisory unit is adapted to monitor an estimated time of arrival of the vehicle at the charging station;

wherein the station command unit is adapted to move the ground lock to a blocking position such that entry to the charging slot is blocked when the estimated time of arrival is less than a first threshold, the first threshold being about 30 minutes;

wherein the controller is adapted to broadcast a message to the station command unit with the identification number, when the estimated time of arrival is less than a second threshold, the second threshold being at or below 5 minutes;

wherein the station command unit is adapted to move the ground lock to a non-blocking position through such that entry to the charging slot is permitted when the identification number broadcasted by the controller matches with the identification sent to the station command unit by the remote advisory unit; and wherein the vehicle and the station command unit are adapted to delete the identification number after the vehicle has entered the charging slot.

20. The system of claim 19, wherein the controller is adapted to:

determine whether an elapsed time is greater than a cancellation grace period when a navigation setting is canceled after the ground lock is in the blocking position; and transmit a request to the remote advisory unit to cancel reservation of the charging slot when the elapsed time is greater than the cancellation grace period, via the controller, the station command unit being adapted to move the ground lock to the non-blocking position.

* * * * *